United States Patent [19]

Tanaka

[11] Patent Number: 5,217,405
[45] Date of Patent: Jun. 8, 1993

[54] HEATER UNIT STRUCTURE OF AIR MIXING APPARATUS FOR AUTOMOTIVE VEHICLE

[75] Inventor: Kazumasa Tanaka, Isehara, Japan

[73] Assignee: Nissan Motor Co., Ltd., Yokohama, Japan

[21] Appl. No.: 704,433

[22] Filed: May 23, 1991

[30] Foreign Application Priority Data

May 25, 1990 [JP] Japan ............................. 2-133986

[51] Int. Cl.⁵ ............................................. B60H 1/26
[52] U.S. Cl. .................................. 454/121; 454/126; 454/160; 454/161
[58] Field of Search ................ 165/42; 237/12.3 A; 454/121, 126, 127, 144, 156, 159, 160, 161

[56] References Cited

U.S. PATENT DOCUMENTS

| | | | |
|---|---|---|---|
| 2,787,888 | 4/1957 | Holmes et al. | 454/156 X |
| 4,356,966 | 11/1982 | Kado | 237/12.3 A |
| 4,582,252 | 4/1986 | Ogihara et al. | 237/12.3 A |
| 4,615,262 | 10/1986 | Taniguchi | 237/12.3 A X |
| 4,907,497 | 3/1990 | Danieau | 454/156 |

FOREIGN PATENT DOCUMENTS 0291397 11/1988 European Pat. Off.
62-286823 12/1987 Japan.

OTHER PUBLICATIONS

Patent Abstracts of Japan, vol. 12, No. 432 (M-763) (3279), Nov. 16, 1988, and Japanese 63-166618, Jul. 9, 1988, abstract.

Primary Examiner—Harold Joyce
Attorney, Agent, or Firm—Foley & Lardner

[57] ABSTRACT

A heater unit of an air mixing apparatus for an automotive vehicle includes a core case for housing a heater core and a distribution case communicating with the core case. The distribution case includes a vent duct connecting port connectable to a vent duct previously fixed to an instrument panel; at least one defroster duct connecting port connectable to at least one defroster duct also previously fixed to the instrument panel; and in particular, a guide duct connectable to a side vent duct extending to a driver seat side and fixed to a vehicle body. Since the guide duct is additionally included with the distribution case, it is possible to previously fix the vent duct extending to the front passenger seat side and defroster ducts to the instrument panel, so that the duct assembly workability is improved markedly and the ducts can be reliably fixed to the instrument panel.

1 Claim, 5 Drawing Sheets

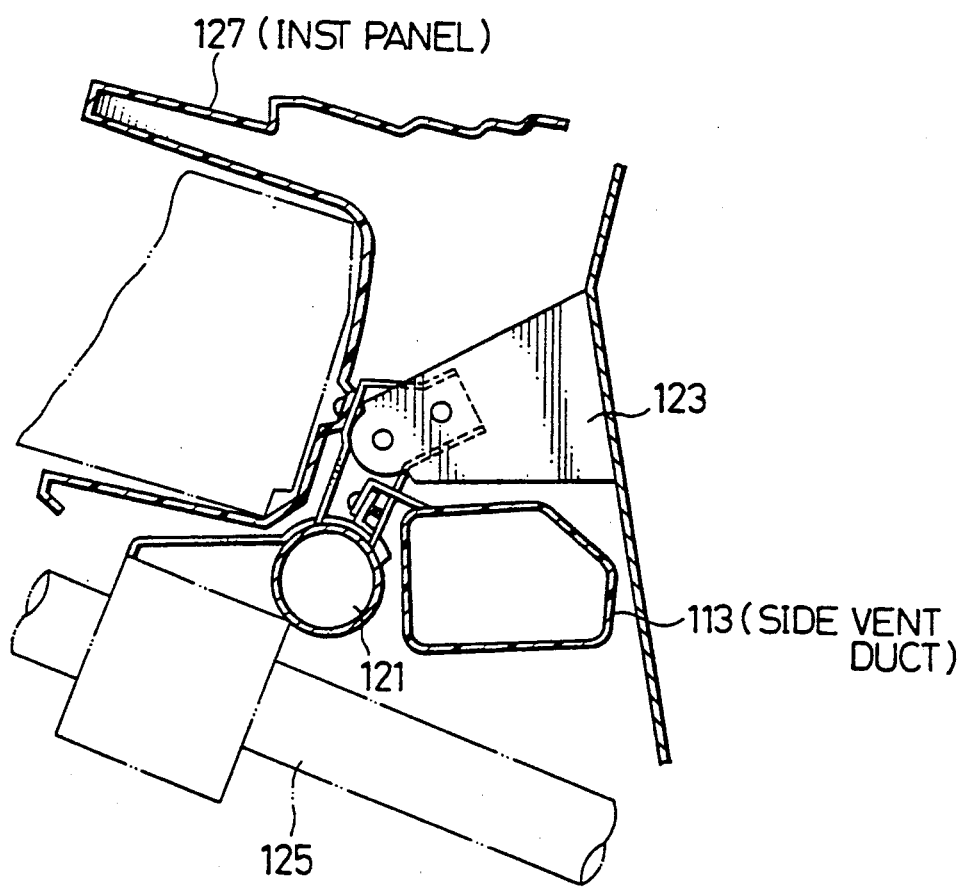

HEATER UNIT STRUCTURE OF AIR MIXING APPARATUS FOR AUTOMOTIVE VEHICLE

BACKGROUND OF THE INVENTION

1. Field of the Invention

The present invention relates to a heater unit structure of an air mixing apparatus for an automotive vehicle, and more specifically to a heater unit structure which can improve the workability of various vent duct assemblies.

2. Description of the Prior Art

In general, an air mixing apparatus for an automotive vehicle includes a blower unit for introducing inside air and outside air, a cooling unit having a cooling heat exchanger, and a heater unit case having a heating heat exchanger and various air blowing outlets. Inside air and outside air introduced through the blower unit are mixed with each other when passing through the cooling and heating heat exchangers, and the mixed air is blown out into the vehicle room through various air blowing outlets.

FIG. 1A shows an example of the conventional structure of the heater unit, which includes a core case 101 having a heating heat exchanger 103 (e.g. heater core), and an air distribution case 105 connectable to a vent duct 107, a defroster duct 109, and a foot duct 111, respectively. Two side vent ducts 113 extending between the driver seat side and the front passenger seat side are usually formed integral with the vent duct 107. Therefore, when the vent door 115, the defroster door 117 and the foot door 119 are pivoted from the respective solid line positions to the respective dot-dot-dashed line positions or vice versa, well mixed air can be selectively blown out through the respective blowing outlets of the respective ducts 107, 109, 111 and 113, as disclosed in Japanese Published Unexamined (Kokai) Patent Appli. No. 62-286823, for instance.

In the prior-art heater unit structure, the assembly procedure is as follows: the heater unit is fixed to the vehicle body; the respective ducts 107, 109 and 111 are attached to the distribution case 105; the instrument panel 127 is fixed to the vehicle body; and the defroster ducts 109 are finally attached to opening portions 129 of the instrument panel 127.

In the above-mentioned prior-art heater unit, however, since the side vent duct 113 is formed integral with the vent duct 107 in such a way as to extend to the driver seat side as shown in FIG. 1B, there exists a problem in that a post bracket 123 for supporting a steering member 121 extending in the vehicle transverse direction interferes with the side vent duct 113 extending to the driver seat side, and therefore the side vent duct 113 becomes complicated in shape because the side vent duct 113 must be arranged through a space enclosed by the post bracket 123, a steering member 121, and a steering column 125.

Accordingly, although the assembly work can be completed by attaching the respective ducts 107, 109, and 111 to the distribution case 105 before attaching the instrument panel 127, there exists a problem in that it takes much time to attach each duct one by one to the distribution case 105 and therefore the assembly productivity is extremely low. In addition, since the instrument panel 127 is large in size and therefore easily deformable in shape, a troublesome assembly work is required to fit a blowing outlet 131 of the defroster duct 109 (for blowing out air toward the windshield 133) to the opening portion 129 of the instrument panel 127. In this assembly work, if the respective ducts 107 and 109 can be first attached to the instrument panel 127, it may be possible to improve the workability of duct assembly between the blowing outlets 131 of the defroster ducts 109 and the openings 129 formed in the instrument panel 127. In this case, however, since the side vent duct 113 formed integral with the vent duct 107 and extending to the driver seat side is complicated in shape there exists a problem in that it is impossible to first attach the respective ducts 109 and 107 to the instrument panel 127. The above-mentioned problem is serious in particular, when the heater unit is mounted on a vehicle body in a full automatic assembly process line.

SUMMARY OF THE INVENTION

With these problems in mind, therefore, it is the primary object of the present invention to provide a heater unit structure of an air mixing apparatus for an automotive vehicle which can improve the workability of the various duct assemblies to the vehicle body.

To achieve the above-mentioned object, the present invention provides a heater unit structure of an air mixing apparatus for an automotive vehicle, comprising: (a) a core case (15) for housing a heater core (13); and (b) a distribution case (17) communicating with said core case and formed with: (1) a vent duct connecting port (25) formed on an upper surface of said distribution case and connectable to a first vent duct (21) previously fixed to an instrument panel (47); (2) at least one defroster duct connecting port (27) formed on the upper surface of said distribution case and connectable to at least one defroster duct (23) also previously fixed to the instrument panel; and (3) a guide duct (37) connectable to a second vent duct (35). The first vent duct is a side vent duct extending to a front passenger seat side, and said second vent-duct is another side vent duct extending to a driver seat side.

Further, the present invention provides a method of connecting vent ducts to a heater unit (5) of an air mixing apparatus for an automotive vehicle, comprising the steps of: (a) fixing a heater unit (5) formed with a vent duct connecting port (25), at least one defroster duct connecting port (27) and a guide duct (37), to a vehicle body; (b) connecting a side vent duct (35) extending to a driver seat side, to the guide duct (37); (c) fixing the side vent duct (35) extending to the driver seat side to the vehicle body; (d) fixing another side vent duct (21) extending to a front passenger seat side and at least one defroster duct (23) to an instrument panel (47); (e) fitting the side vent duct (21) extending to the front passenger-seat side and the defroster duct (23) already fixed to the instrument panel, to the vent duct connecting port (25) and the defroster duct connecting port (27) of the heater unit; and (f) fixing the instrument panel to the vehicle body.

In the heater unit structure and the method according to the present invention, since the guide duct that is connectable to a side vent duct which is formed into a complicated shape and extends to the driver seat side is formed integral with the distribution case and, therefore, the complicated-shape side vent duct is connected to the distribution case via the guide duct, it is possible to first attach the vent duct extending to the front passenger seat side and the defroster ducts to the instrument panel, so that workability of various duct assemblies can be improved markedly. In addition, since the vent duct and the defroster ducts can be first securely connected to the instrument panel, it is possible to prevent air leakage through the connecting portions between the two.

BRIEF DESCRIPTION OF THE DRAWINGS

FIG. 1B is a cross-sectional view showing the side vent duct of the prior-art apparatus arranged extending to the driver seat side;

DETAILED DESCRIPTION OF THE PREFERRED EMBODIMENT

Figure 1A:
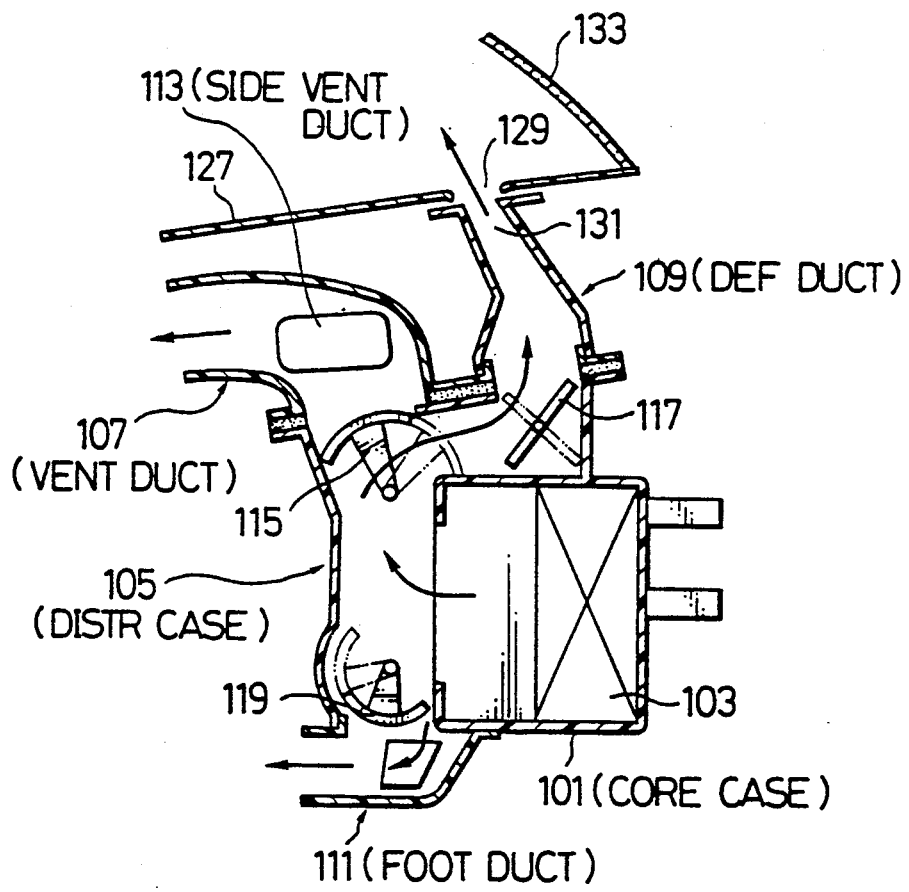
FIG. 1A is a cross-sectional side view showing a prior-art air mixing apparatus, in which R-F indicates the vehicle front-rear direction.
Figure 2:
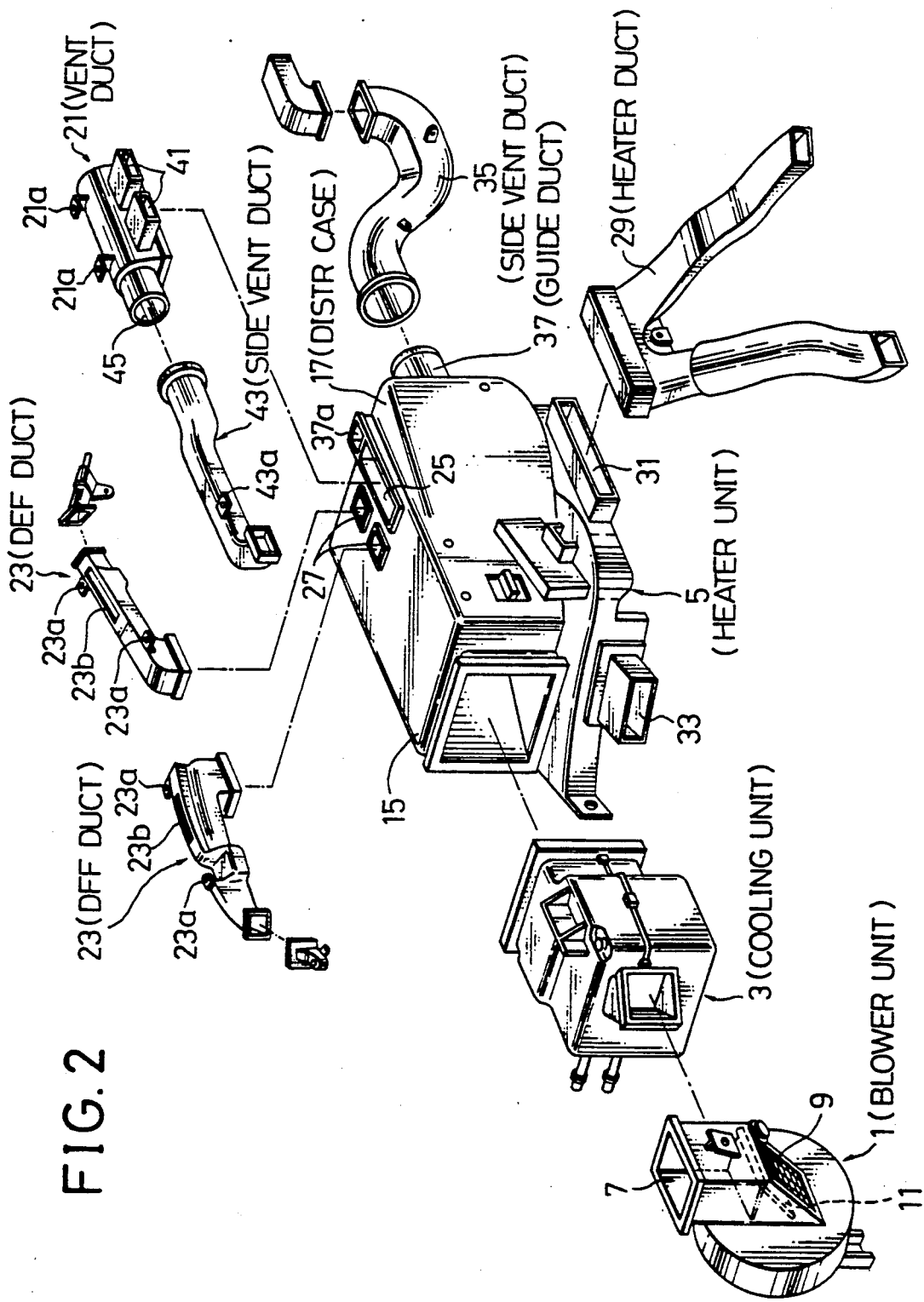
FIG. 2 is an exploded view showing the air mixing apparatus for an automotive vehicle according to the present invention.

An embodiment of the present invention will be described hereinbelow in detail with reference to FIG. 2 to 5. FIG. 2 is an air mixing apparatus for an automotive vehicle, which comprises a blower unit 1, a cooling unit 3, and a heater unit 5. The blower unit 1 is provided with a motor fan (not shown), an outside air introducing port 7 for introducing outside air into the vehicle room by the motor fan, and an inside air introducing port 9 for introducing vehicle inside air thereinto by the motor fan. The respective ports 7 and 9 can be closed or opened by a pivotal flapper 11 actuated in response to a change-over mode switch (not shown). In more detail, when the pivotal flapper 11 is pivoted upward at the dot-dot-dashed line, since the outside air introducing port 7 is closed, the inside air introducing port 9 is fully opened. On the other hand, when the pivotal flapper 11 is pivoted downward at the dashed line, since the inside air introducing port 9 is closed, the outside air introducing port 7 is fully opened. Further, a cooling heat exchanger (not shown) such as an evaporator is provided within the cooling unit 3, and the heater unit 5 is connected to the downstream side of the cooling heat exchanger.

Figure 4:
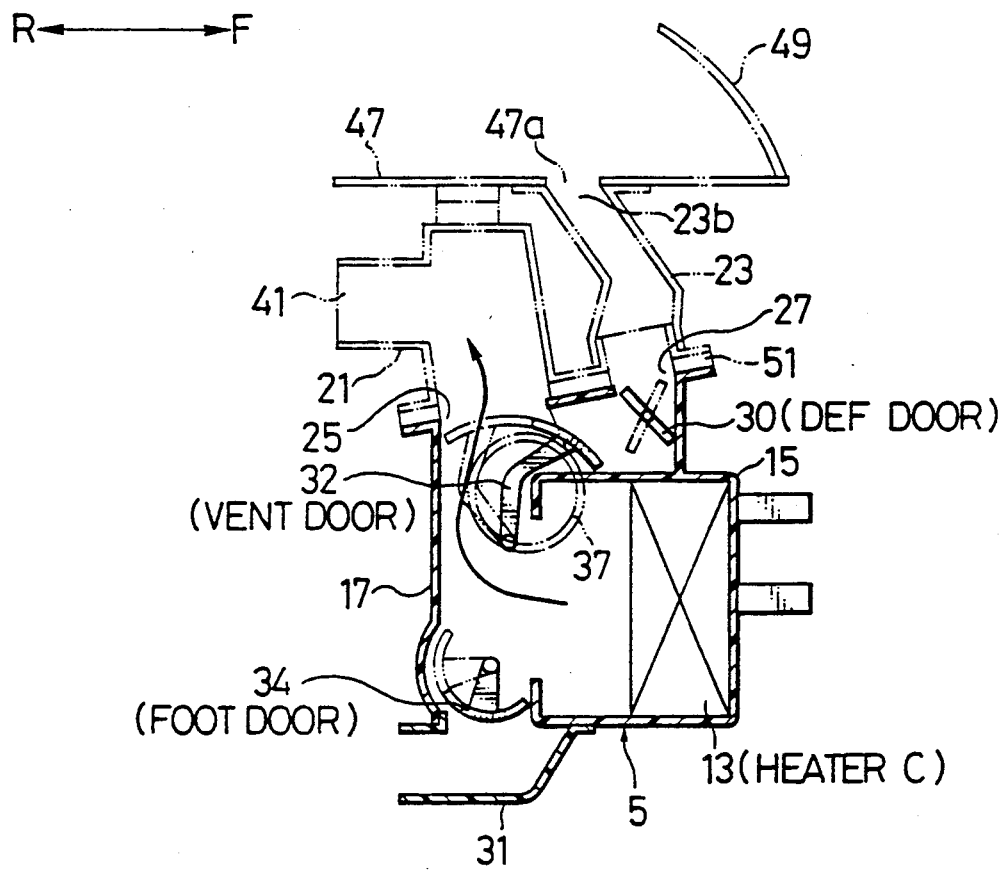
FIG. 4 is a cross-sectional side view of the heater unit shown in FIG. 2, taken along the vehicle longitudinal direction.
Figure 5:
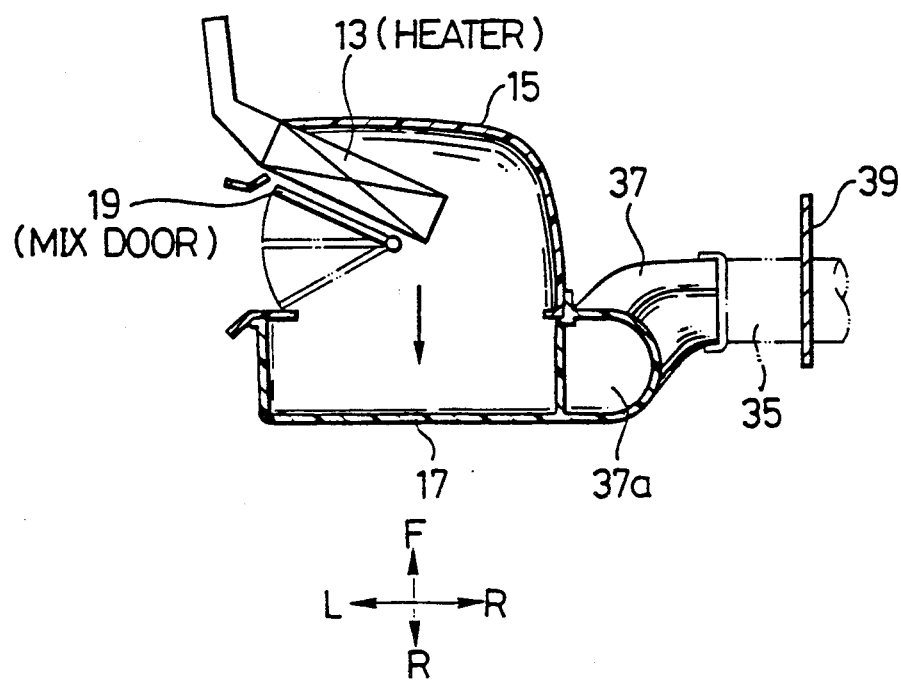
FIG. 5 is a cross-sectional top view of the heater unit shown in FIG. 2, taken along the vehicle transverse direction.

The heater unit 5 is formed with a core case 15 for housing a heater core 13 and a distribution case 17 communicating with the core case 15, as shown in FIG. 4.

An air mix door 19 (shown in FIG. 5) is disposed on the upstream side of the heater core 13 through which coolant of an engine (not shown) is passed. The coolant temperature increases with increasing engine temperature.

When the air mix door 19 is located at the solid line position (in FIG. 5), air cooled through the cooling heat exchanger flows without being passed through the heater core 13; on the other hand, when the air mix door 19 is located at the dot-dot-dashed line position, air cooled through the cooling heat exchanger flows through the heater core 13. Accordingly, the amount of air passing through the heater core 13 can be adjusted according to the opening rate (pivotal position) of the air mix door 19, and the mixed air flows into the distribution case 17.

The distribution case 17 is formed on the upper surface thereof with first and second upper duct connecting ports 25 and 27 connectable to a side vent duct 21 extending to the front passenger seat side and two defroster ducts 23, respectively. Further, the distribution case 17 is formed on the lower part thereof with a third duct connecting port 31 connectable to a bifurcated rear duct 29 and a foot blowing port 33. Therefore, when a defroster door 30, a door 32 and a foot door 34 are pivoted from the respective solid line positions to the dot-dot-dashed line positions or vice versa in FIG. 4, it is possible to control the amount of air passed through the respective ducts 23, 21 and 29, in various combination modes.

Further, the air mix door 19 can be controllably pivoted in response to signals from an inside-outside temperature selecting switch; and the defroster door 30, the vent door 32 and the foot door 34 can be controllably pivoted in response to signals from a blower port selecting switch.

Figure 3:
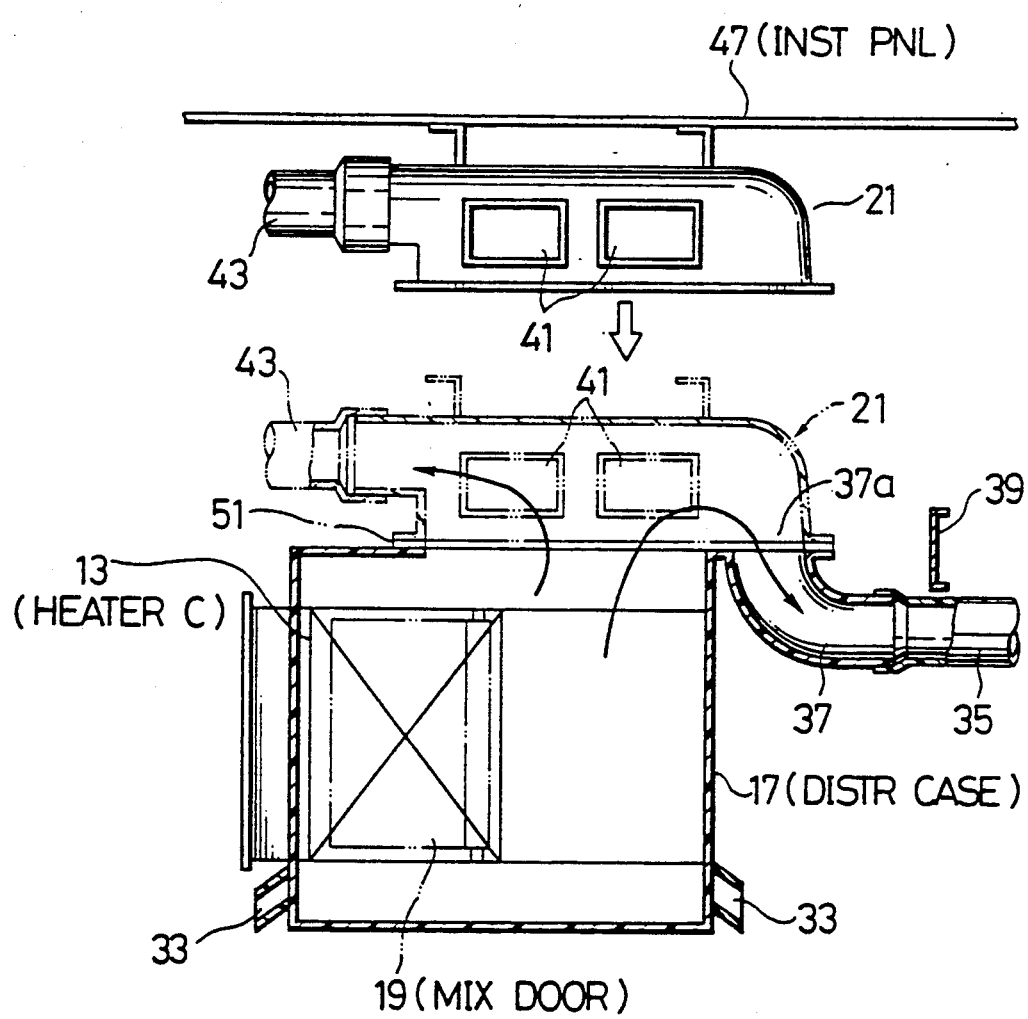
FIG. 3 is a cross-sectional side view of the heater unit shown in FIG. 2, taken along the vehicle transverse direction, in which L-R indicates the vehicle left-right direction.

Further, the distribution case 17 is formed with a guide duct 37 connectable to a side vent duct 35 extending to a driver seat side and fixed to the vehicle body. As shown in FIG. 3, since the side vent duct 35 is disposed so as to extend under the post bracket 39, the guide duct 37 is formed into a curved shape extending from the upper opening 37a to the lower side thereof, so as to be connectable to the side vent duct 35.

The upper opening 37a of the guide duct 37 is formed side by side with the first duct connecting port 25. Therefore, when the vent duct 21 is connected to the first duct connecting port 25 of the distributing case 17, the upper opening 37a of the guide duct 37 communicates with the duct 21, so that mixed air flows into the guide duct 37 via the vent duct 21 as shown by the thick curved line in FIG. 3.

On the other hand, the vent duct 21 is formed with two center vent blowing outlets 41 and a connecting port 45 connected to a side vent duct 43 extending to the front passenger seat (the leftward side in FIG. 2). The vent duct 21, the side vent duct 43, and the defroster ducts 23 are all attached to the inside surface of the instrument panel 47 with respective brackets 21a, 43a, and 23a, respectively before being attached to the distributing case 17. In this case, each blowing outlet 23b of each defroster duct 23 is securely located and connected to the opening 47a of the instrument panel 47 as shown in FIG. 4. Further, in FIG. 4, 49 denotes a front windshield and 51 denotes a sealing urethane sandwiched between the distributing case 17 and the defroster duct 23.

In the heater unit structure constructed as described above, the assembling procedure is as follows: the heater unit 5 is fixed to the vehicle body; the side vent duct 35 on the driver seat side is connected to the guide duct 37 of the distributing case 17 and fixed to the vehicle body; the vent duct 21 and the two defroster ducts 23 are connected to the instrument panel 47; the instrument panel 47 is temporarily mounted on the vehicle body; the vent duct 21 and the two defroster ducts 23 connected to the instrument panel 47 are fitted from above to the first and second duct connecting ports 25 and 27 of the distributing case 17, and the instrument panel 47 is fixed to the vehicle body. Therefore, it is possible to simultaneously connect the side vent duct 43 and the vent duct 21 and the two defroster ducts 23 to the heater unit 5 when the instrument panel 47 is fixed to the vehicle body.

Further, it is possible to eliminate the work of fitting the blowing ports 23b of the defroster duct 23 to the opening 47a of the instrument panel 47 after the instrument panel 47 has been fixed to the vehicle body. Further, since the defroster ducts 23 are connected to the connecting ports 27 of the distributing case 17 via the sealing urethane 51, it is possible to blow out mixed air from the blowing outlet 23b of the defroster ducts 23 toward the windshield 49 effectively, without leakage through the connecting portions.

As described above, in the heater unit structure according to the present invention, since the distributing case 17 is formed with the curved guide duct 37 connectable to the driver-side vent duct, it is possible to attach the passenger-side vent duct and the defroster ducts to the instrument panel before attaching them to the distributing case, thus, making it possible to markedly improve the workability of the duct assembly.

Further, since the blowing outlets of the defroster ducts can be securely attached to the instrument panel before the instrument panel is attached to the distributing case, it is possible to effectively blow out air without leakage through the connection portions of the blowing outlets.

What is claimed is:

1. A heater unit structure of an air mixing apparatus for an automotive vehicle, comprising:
   (a) a core base for housing a heater core; and
   (b) a distribution case communicating with said core case and formed with:
      (1) a vent duct connecting port formed on an upper surface of said distribution case and connectable to a first vent duct previously fixed to an instrument panel;
      (2) at least one defroster duct connecting port formed on the upper surface of said distribution case and connectable to at least one defroster duct also previously fixed to the instrument panel; and
      (3) a guide duct connectable to a second vent duct, said guide duct being formed into a curved shape extending from an upper opening thereof to the lower side thereof so as to communicate with the first vent duct on the upper surface of said distribution case.

* * * * *